(12) United States Patent
Lu et al.

(10) Patent No.: US 11,303,190 B2
(45) Date of Patent: Apr. 12, 2022

(54) RARE-EARTH PERMANENT-MAGNETIC AXIAL CORELESS GENERATOR WITH DOUBLE MAGNETIC CIRCUITS

(71) Applicant: Jirong Lu, Beijing (CN)

(72) Inventors: Jirong Lu, Beijing (CN); Yao Lu, Beijing (CN)

(73) Assignee: Jirong Lu, Beijing (CN)

( * ) Notice: Subject to any disclaimer, the term of this patent is extended or adjusted under 35 U.S.C. 154(b) by 15 days.

(21) Appl. No.: 17/031,581

(22) Filed: Sep. 24, 2020

(65) Prior Publication Data

US 2021/0367493 A1 Nov. 25, 2021

(30) Foreign Application Priority Data

May 19, 2020 (CN) .......................... 202020866977.2

(51) Int. Cl.
*H02K 16/02* (2006.01)
*H02K 3/47* (2006.01)

(52) U.S. Cl.
CPC ............... *H02K 16/02* (2013.01); *H02K 3/47* (2013.01); *H02K 2203/06* (2013.01)

(58) Field of Classification Search
CPC ....... H02K 16/02; H02K 3/47; H02K 2203/06
See application file for complete search history.

(56) References Cited

U.S. PATENT DOCUMENTS

| | | | | |
|---|---|---|---|---|
| 5,311,092 A | * | 5/1994 | Fisher | H02K 33/18 310/266 |
| 6,727,632 B2 | * | 4/2004 | Kusase | H02K 1/27 310/112 |
| 7,791,242 B2 | * | 9/2010 | Bojiuc | H02K 99/20 310/200 |
| 8,299,676 B2 | * | 10/2012 | Miyata | H02K 3/47 310/208 |
| 2013/0093276 A1 | * | 4/2013 | Kim | H02K 16/00 310/114 |

FOREIGN PATENT DOCUMENTS

| | | |
|---|---|---|
| CN | 2354289 Y | 12/1999 |
| CN | 2817186 Y | 9/2006 |
| CN | 105763010 A | 7/2016 |

* cited by examiner

Primary Examiner — Dang D Le

(57) ABSTRACT

Disclosed a rare-earth permanent-magnetic axial coreless generator with double magnetic circuits, including a main shaft, a coreless stator winding, an inner rotor structure connected with the main shaft and an outer rotor structure. The outer rotor structure and the inner rotor structure are spaced apart by the coreless stator winding and are connected with the main shaft; the coreless stator winding is arranged between the inner rotor structure and the outer rotor structure, to establish a generator structure with two magnetic field air gaps; when the main shaft drives the outer rotor structure and the inner rotor structure to rotate simultaneously under the action of an external force, a rotating magnetic field with double magnetic circuits is generated in the generator; and the coreless stator winding can simultaneously cut magnetic lines of the rotating magnetic field with double magnetic circuits by using contact surfaces inside and outside the winding.

2 Claims, 6 Drawing Sheets

RARE-EARTH PERMANENT-MAGNETIC AXIAL CORELESS GENERATOR WITH DOUBLE MAGNETIC CIRCUITS

CROSS-REFERENCE TO RELATED APPLICATIONS

This application claims the benefit of priority from Chinese Patent Application No. 202020866977.2, filed on May 19, 2020. The content of the aforementioned applications, including any intervening amendments thereto, is incorporated herein by reference in its entirety.

TECHNICAL FIELD

The present invention relates to the field of motors, in particular to a rare-earth permanent-magnetic axial coreless generator with double magnetic circuits.

BACKGROUND OF THE PRESENT INVENTION

In the existing motor technology, the conventional permanent magnetic generator has only one stator core winding and one permanent magnet rotor structure. Since the stator windings are arranged in a cog slot of a silicon steel sheet core in sequence, a cog slot resistance moment of a permanent magnet for attracting to the silicon steel sheet core will be naturally generated in air gaps between the core structure and the permanent magnet rotor of the stator winding. When the permanent magnetic generator generates the electricity, the attracted stator cog slot structure will have hysteresis resistance and eddy current resistance phenomena and have heat energy consumption of iron loss. Therefore, the coreless generator with higher energy conversion efficiency will become the development direction of the motor industry. However, the coreless stator winding has no magnetic permeability of the silicon steel sheet core, so the density of cut magnetic force lines of the rotating magnetic field will be reduced relative to the coreless stator winding.

SUMMARY OF THE PRESENT INVENTION

According to the design structure of the conventional axial coreless permanent magnetic generators, only one rotating magnetic field of a permanent magnet inner rotor can be generated in an air gap between a coreless stator winding and a permanent magnet inner rotor; and the permanent magnet inner rotor structure can only cut the magnetic lines of the rotating magnetic field of the permanent magnet inner rotor by using one contact surface inside the coreless stator winding. Therefore, the purpose of the present invention is to provide a rare-earth permanent-magnetic axial coreless generator with double magnetic circuits. One permanent magnet outer rotor structure is added outside the coreless stator winding, so that when a main shaft is driven to rotate by an external force, the coreless stator winding can simultaneously cut the magnetic force lines of the rotating magnetic field with double magnetic circuits formed by the outer rotor structure and the inner rotor structure by using contact surfaces inside and outside the winding, thereby increasing the power generating capacity of the generator.

To achieve the above purpose, the rare-earth permanent-magnetic axial coreless generator with double magnetic circuits provided by the present invention includes:

a main shaft;

a coreless stator winding, which is arranged between the inner rotor structure and the outer rotor structure, and can simultaneously cut a rotating magnetic field of the inner rotor structure and a rotating magnetic field of the outer rotor structure to generate power generation current;

an inner rotor structure, which is connected with the main shaft, has an independent permanent magnetic circuit and can be driven to rotate by the main shaft to generate one rotating magnetic field; and an outer rotor structure, which is spaced apart from the inner rotor structure by the coreless stator winding, is connected with the main shaft, has an independent permanent magnetic circuit and can be driven to rotate by the main shaft to generate the other rotating magnetic field.

Preferably, the coreless stator winding further includes coil assemblies and a lead-out wire; the coil assemblies can simultaneously cut the rotating magnetic field of the inner rotor structure and the rotating magnetic field of the outer rotor structure to generate the power generation current; and the lead-out wire is used for connecting the coil assemblies with external electrical equipment.

Preferably, the inner rotor structure further includes permanent magnets of inner rotor, an annular load bearing piece of inner rotor, a connecting piece of inner rotor and a fixing casing of inner rotor; the permanent magnets of inner rotor are arranged on an outer wall of the annular load bearing piece of inner rotor to form a permanent magnetic field; one end of the connecting piece of inner rotor is connected with an inner wall of the annular load bearing piece of inner rotor; the other end of the connecting piece of inner rotor is connected with the casing of the inner rotor; and the casing of the inner rotor is sleeved on the main shaft.

Preferably, the outer rotor structure further includes permanent magnets of outer rotor, an annular load bearing piece of outer rotor, a connecting piece of outer rotor and a fixing casing of outer rotor; the permanent magnets of outer rotor are arranged on the inner wall of the annular load bearing piece of outer rotor to form a permanent magnetic field; one end of the connecting piece of outer rotor is connected with the inner wall of the annular load bearing piece of outer rotor; the other end of the connecting piece of outer rotor is connected with the casing of the outer rotor; and the fixing casing of outer rotor is sleeved on the main shaft.

The technical solution of the present invention has the follow advantages: the power generation function can be realized as long as the generator has the coreless stator winding and any design of the permanent magnet inner rotor structure and the permanent magnet outer rotor structure in the present invention according to the working principle of the permanent magnetic generator. However, the generator according to the present invention simultaneously has the permanent magnet inner rotor structure and the permanent magnet outer rotor structure; the main shaft drives the inner rotor structure and the outer rotor structure, which are connected with the main shaft, to rotate simultaneously, so that the coreless stator winding can simultaneously cut the rotating magnetic field of the permanent magnet inner rotor and the rotating magnetic field of the permanent magnet outer rotor to increase the power generating capacity of the coreless generator. The coreless stator winding does not have the core structure of the silicon steel sheet, so as to prevent the hysteresis resistance and eddy current resistance phenomena and also avoid the heat energy consumption of iron loss.

BRIEF DESCRIPTION OF THE DRAWINGS

To more clearly describe the technical solutions in the embodiments of the present invention or in prior art, the drawings required to be used in the embodiments will be simply presented below. Apparently, the drawings in the following description are merely some embodiments of the present invention, and for those skilled in the art, other drawings can also be obtained according to the structures shown by the drawings without contributing creative labor.

In the figures, 1. main shaft; 2. stator winding; 21. coil assembly; 22. lead-out wire; 23. winding fastening bolt; 3. inner rotor structure; 31. permanent magnet of inner rotor; 32. annular load bearing piece of inner rotor; 33. connecting piece of inner rotor; 34. fixing casing of inner rotor; 4. outer rotor structure; 41. permanent magnet of outer rotor; 42. annular load bearing piece of outer rotor; 43. connecting piece of outer rotor; 44. fixing casing of outer rotor; 51. housing; 52. rear end cover; 521. reserved lead-out hole; 53. front end cover; 54. housing fastening bolt; 55. first bearing; 56. second bearing; 6. main shaft connecting plate; and 7. generator base.

DETAILED DESCRIPTION OF THE PRESENT INVENTION

The rare-earth permanent-magnetic axial coreless generator with double magnetic circuits will be clearly and fully described in detail below in combination with drawings in specific embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

A specific structure of a rare-earth permanent-magnetic axial coreless generator with double magnetic circuits will be described below.

Figure 1:
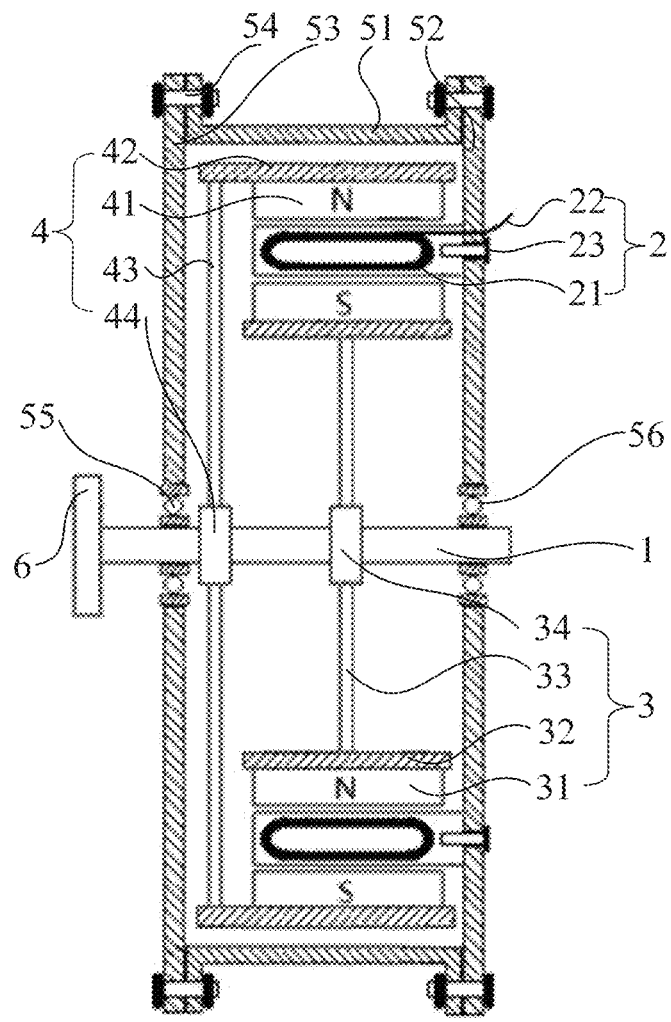
FIG. 1 is a structural schematic diagram of a side profile of a rare-earth permanent-magnetic axial coreless generator with double magnetic circuits according to an embodiment.
Figure 2:
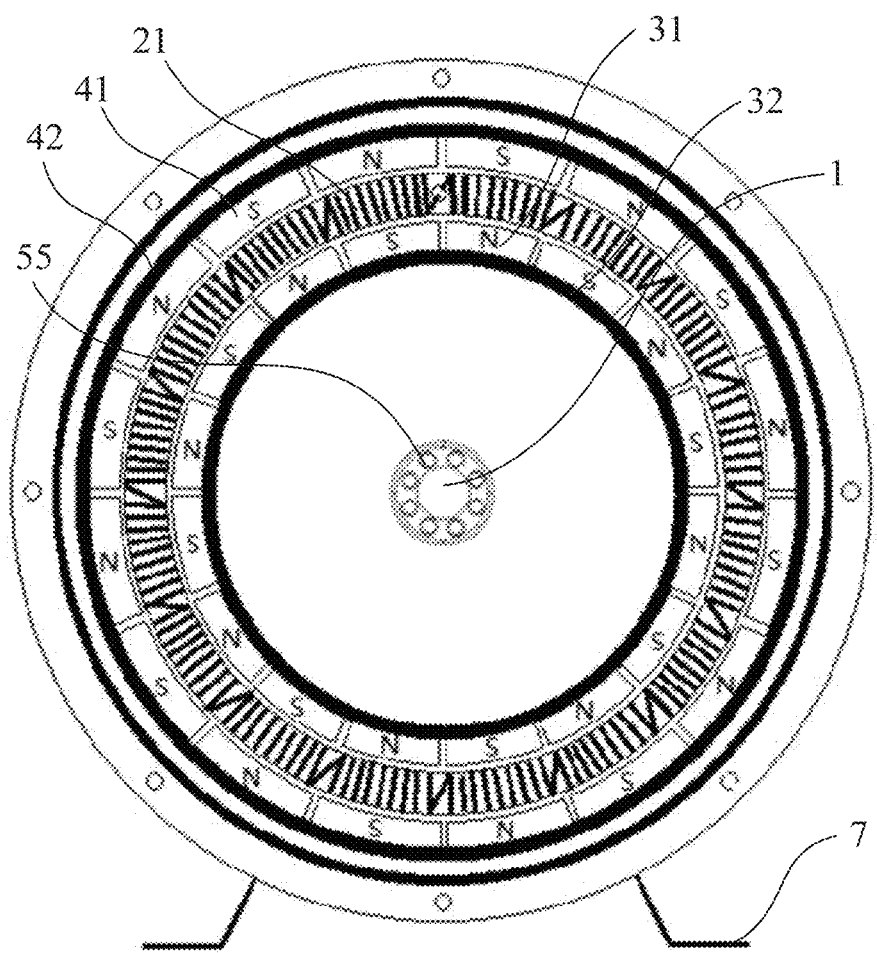
FIG. 2 is a structural schematic diagram of an inner rotor structure, a stator winding and an outer rotor structure of a rare-earth permanent-magnetic axial coreless generator with double magnetic circuits according to an embodiment.

As shown in FIGS. 1-2, the rare-earth permanent-magnetic axial coreless generator with double magnetic circuits includes a main shaft 1, a stator winding 2, an inner rotor structure 3 and an outer rotor structure 4. The inner rotor structure 3 is connected with the main shaft 1, can be driven to rotate by the main shaft 1, and has an independent electromagnetic induction magnetic circuit. The outer rotor structure 4 and the inner rotor structure 3 are spaced apart relative to the coreless stator winding 2; and the outer rotor structure 4 is connected with the main shaft 1. The main shaft 1 can drive the outer rotor structure 4 and the inner rotor structure 3 to rotate synchronously. The outer rotor structure 4 has an independent electromagnetic induction magnetic circuit. The stator winding 2 is arranged between the inner rotor structure 3 and the outer rotor structure 4. The main shaft 1 drives the inner rotor structure 3 and the outer rotor structure 4, which are connected with the main shaft 1, to rotate synchronously, thereby driving the inner rotor magnetic field and the outer rotor magnetic field to rotate synchronously to generate a rotating magnetic field with double magnetic circuits. The coreless stator winding 2 can simultaneously cut the magnetic lines of the rotating magnetic field of the inner rotor structure and the rotating magnetic field of the outer rotor structure by using contact surfaces inside and outside the winding to generate power generation current and realize the power generation process of the rare-earth permanent-magnetic axial coreless generator with double magnetic circuits. Specifically, the main shaft 1 rotates under the driving of external driving equipment. In addition, the coreless stator winding 2 is arranged between the inner rotor structure 3 and the outer rotor structure 4. A double-magnetic-circuit design structure with two magnetic field air gaps is established for the rare-earth permanent-magnetic axial coreless generator with double magnetic circuits, so that the coreless stator winding 2 can simultaneously cut the rotating magnetic field of the inner rotor structure 3 and the rotating magnetic field of the outer rotor structure 4 by using the contact surfaces inside and outside the winding, to generate power generation current.

Figure 6:
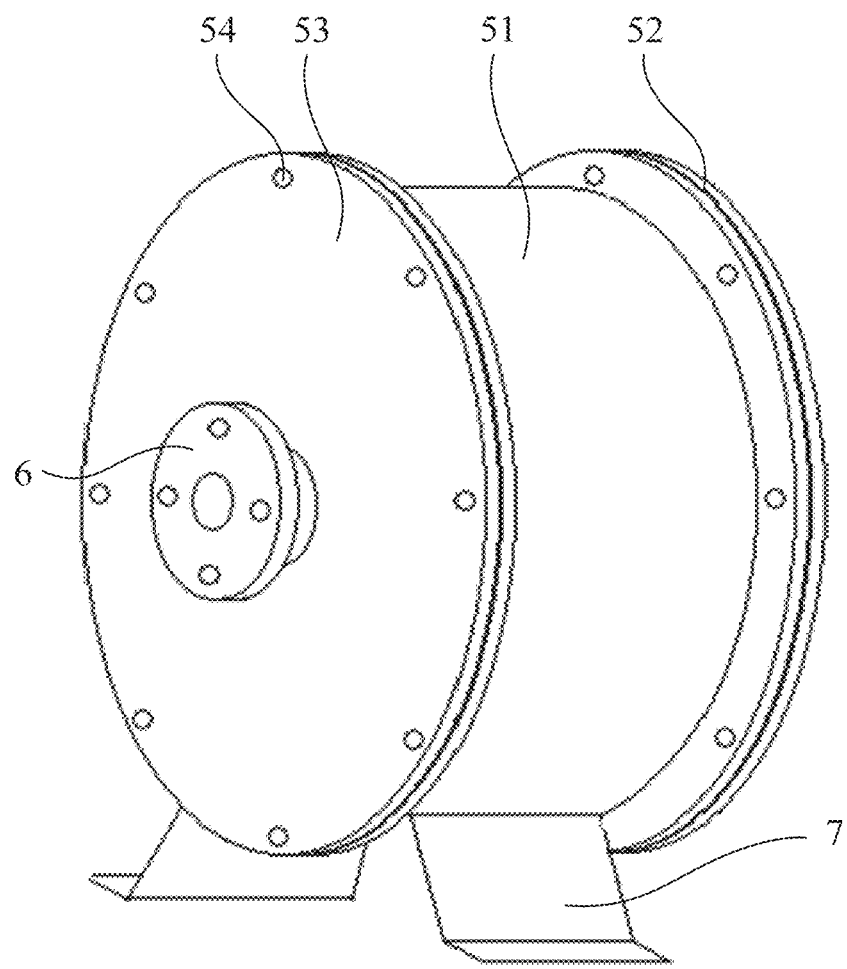
FIG. 6 is a structural schematic diagram of a rare-earth permanent-magnetic axial coreless generator with double magnetic circuits according to an embodiment.

As shown in FIGS. 1 and 6, the rare-earth permanent-magnetic axial coreless generator with double magnetic circuits further includes a housing 51, a rear end cover 52, a front end cover 53, housing fastening bolts 54, a first bearing 55 and a second bearing 56. The housing 51 is connected with the rear end cover 52 by eight housing fastening bolts 54. The second bearing 56 is embedded in the rear end cover 52. One end of the main shaft 1 is arranged in a bearing hole of the second bearing 56; and the first bearing 55 is sleeved on the other end of the main shaft 1. The front end cover 53 is sleeved on the first bearing 55; and an outer ring of the front end cover 53 is fixedly connected with the housing 51 by eight housing fastening bolts 54. Specifically, a plurality of housing fastening bolts 54 are provided. It can be understood that the number of the housing fastening bolts 54 can be selected reasonably according to the change in diameter of the generator in other embodiments, and sixteen housing fastening bolts are designed in the accompanying drawings of the present embodiment.

Figure 3:
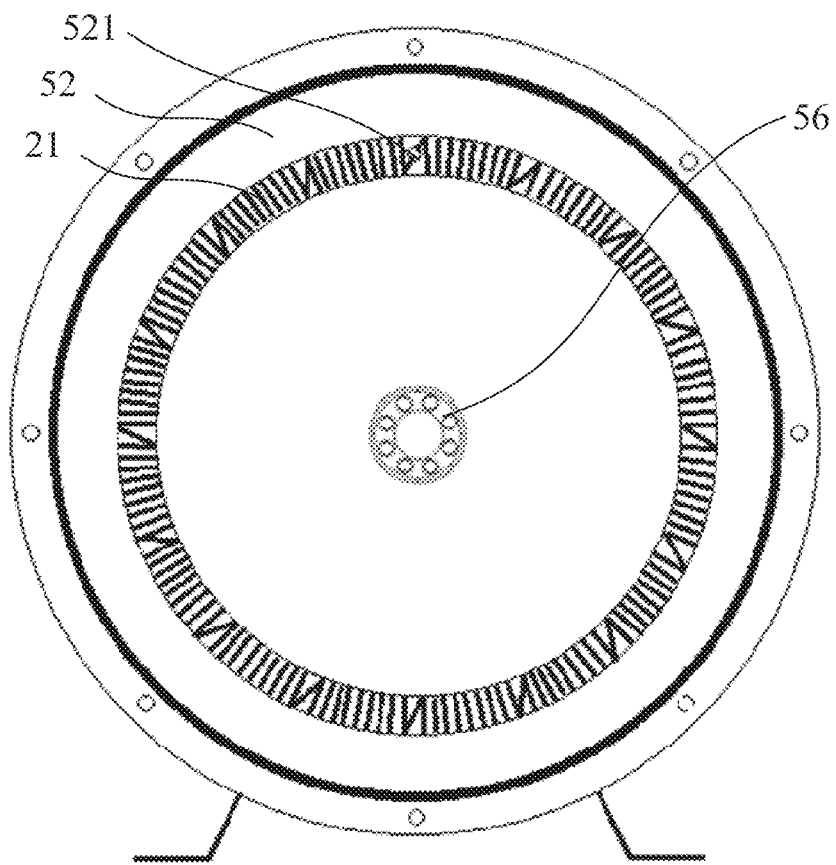
FIG. 3 is a structural schematic diagram of a stator winding of a rare-earth permanent-magnetic axial coreless generator with double magnetic circuits according to an embodiment.

As shown in FIGS. 1 and 3, the coreless stator winding 2 includes coil assemblies 21 and a lead-out wire 22. In addition, the coreless stator winding 2 also includes winding fastening bolts 23. A plurality of coil assemblies 21 are poured into an annular coreless stator winding structure 2 by adopting an encapsulation technology of polymer insulation materials. The poured coil assemblies 21 are fixedly connected with the rear end cover 52 by the winding fastening bolts 23. The lead-out wire 22 is used for outputting the current generated by the coil assemblies 21 to the external electrical equipment. Specifically, a plurality of winding fastening bolts 23 are provided. It can be understood that only two winding fastening bolts 23 are labeled in the present embodiment according to the reasonable selection of winding fastening strength, so as to illustrate the fastening effect. A reserved lead-out hole 521 is formed in the rear end cover 52; and the lead-out wire 22 passes through the lead-out hole 521 in the rear end cover 52 and is connected with the external electrical equipment. The coil assemblies 41 made of polymer insulation resin materials can also play a waterproof role.

Figure 4:
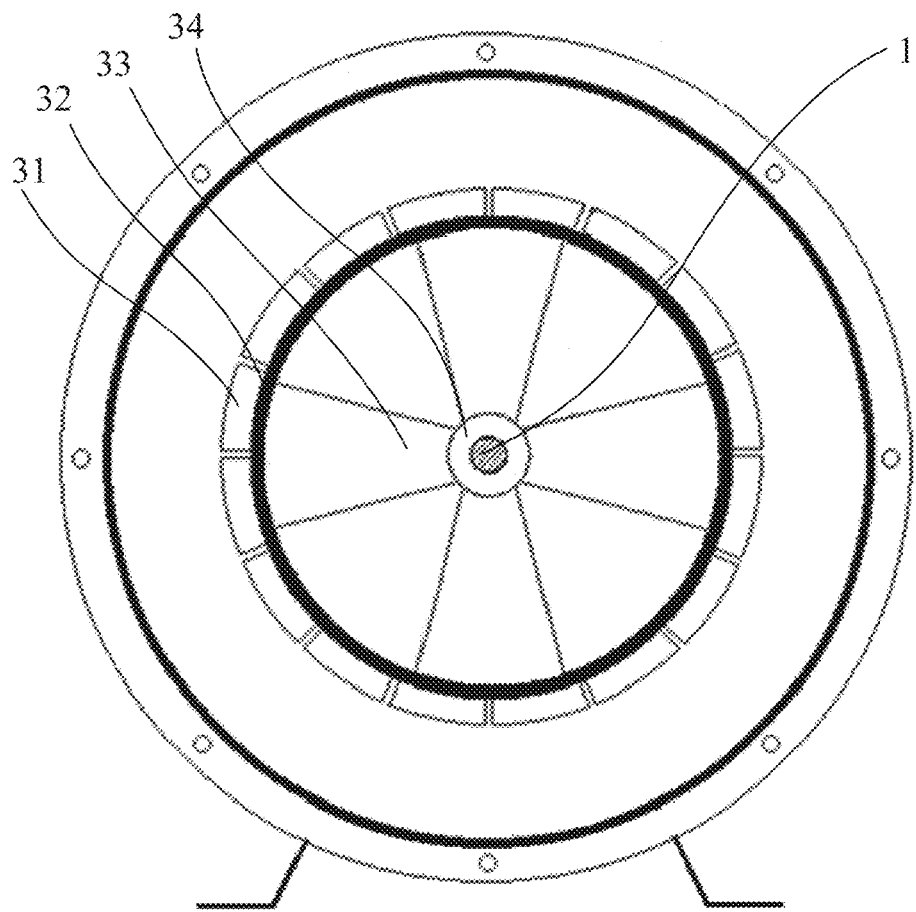
FIG. 4 is a structural schematic diagram of an inner rotor structure of a rare-earth permanent-magnetic axial coreless generator with double magnetic circuits according to an embodiment.

As shown in FIGS. 1 and 4, the inner rotor structure 3 includes permanent magnets 31 of inner rotor, an annular load bearing piece 32 of inner rotor, a connecting piece 33 of inner rotor and a casing 34 of inner rotor. The permanent magnets 31 of inner rotor are arranged on an outer wall of the annular load bearing piece 32 of inner rotor according to an arrangement sequence of multiple N poles and S poles to form a permanent magnetic circuit. One end of the connecting piece 33 of inner rotor is connected with an inner wall of the annular load bearing piece 32 of inner rotor; and the other end of the connecting piece 33 of inner rotor is connected with the casing 34 of inner rotor. The casing 34 of inner rotor is sleeved on the main shaft 1.

Figure 5:
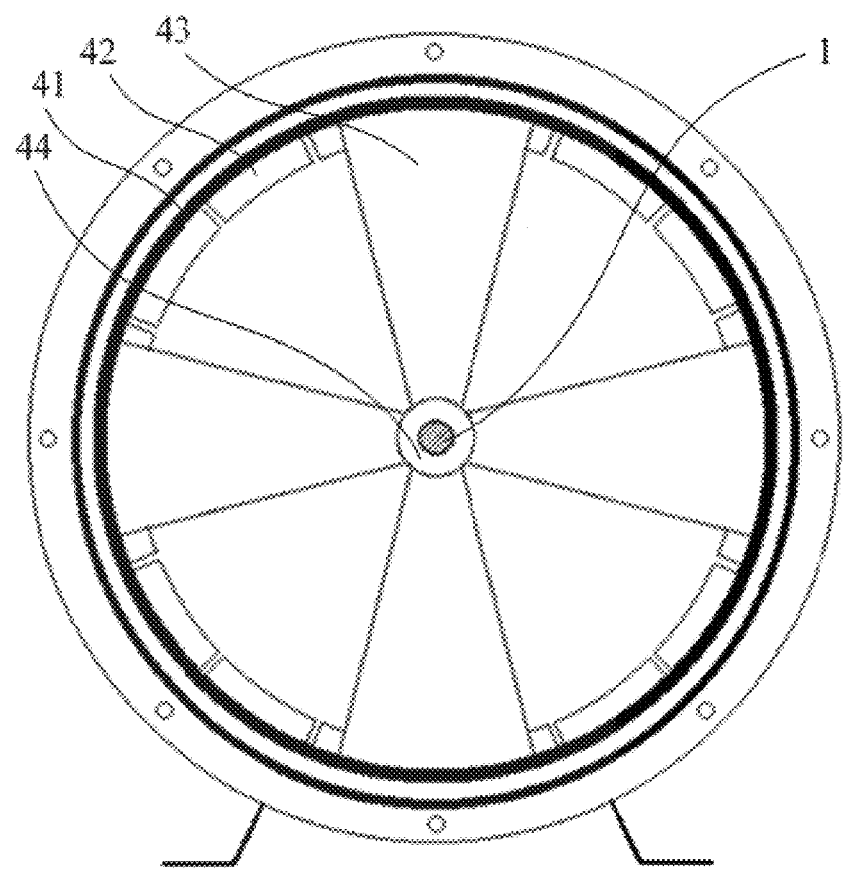
FIG. 5 is a structural schematic diagram of an outer rotor structure of a rare-earth permanent-magnetic axial coreless generator with double magnetic circuits according to an embodiment.

As shown in FIGS. 1 and 5, the outer rotor structure 4 includes permanent magnets 41 of outer rotor, an annular load bearing piece 42 of outer rotor, a connecting piece 43 of outer rotor and a casing 44 of outer rotor. The permanent magnets 41 of outer rotor are arranged on the inner wall of the annular load bearing piece 42 of outer rotor according to an arrangement sequence of multiple N poles and S poles to form a permanent magnetic circuit. One end of the connecting piece 43 of outer rotor is connected with the inner wall of the annular load bearing piece 42 of outer rotor; and the other end of the connecting piece 43 of outer rotor is connected with the casing 44 of outer rotor. The casing 44 of outer rotor is sleeved on the main shaft 1.

As shown in FIG. 6, the rare-earth permanent-magnetic axial coreless generator with double magnetic circuits further includes a main shaft connecting plate 6 and a generator base 7. The main shaft connecting plate 6 is connected with the main shaft 1. The main shaft 1 is fixedly connected with a driving shaft of the external driving equipment through the main shaft connecting plate 6, so that the main shaft 1 is driven to rotate. The generator base 7 is connected with the housing 51 and is used for fixing the generator structure.

The above only describes preferred embodiments of the present invention, and is not intended to limit the patent scope of the present invention. Any equivalent structural transformation made by using the contents of the description and the drawings of the present invention or direct/indirect application of the contents to other related technical fields under the concept of the present invention shall be included in the patent protection scope of the present invention.

What is claimed is:

1. A rare-earth permanent-magnetic axial coreless generator with double magnetic circuits, comprising:
   a main shaft (1);
   a coreless stator winding (2), which is arranged between the inner rotor structure (3) and the outer rotor structure (4), and can simultaneously cut a rotating magnetic field of the inner rotor structure (3) and a rotating magnetic field of the outer rotor structure (4) to generate power generation current;
   an inner rotor structure (3), which is connected with the main shaft (1), has an independent permanent magnetic circuit and can be driven to rotate by the main shaft (1) to generate one rotating magnetic field; and
   an outer rotor structure (4), which is spaced apart from the inner rotor structure (3) by the coreless stator winding (2), is connected with the main shaft (1), has an independent permanent magnetic circuit and can be driven to rotate by the main shaft (1) to generate the other rotating magnetic field;
   wherein the inner rotor structure (3) comprises permanent magnets (31) of inner rotor, an annular load bearing piece (32) of inner rotor, a connecting piece (33) of inner rotor and a fixing casing (34) of inner rotor; the permanent magnets (31) of inner rotor are arranged on an outer wall of the annular load bearing piece (32) of inner rotor to form a permanent magnetic field; one end of the connecting piece (33) of inner rotor is connected with an inner wall of the annular load bearing piece (32) of inner rotor; the other end of the connecting piece (33) of inner rotor is connected with the fixing casing (34) of the inner rotor; and the fixing casing (34) of the inner rotor is sleeved on the main shaft (1).

2. A rare-earth permanent-magnetic axial coreless generator with double magnetic circuits, comprising:
   a main shaft (1);
   a coreless stator winding (2), which is arranged between the inner rotor structure (3) and the outer rotor structure (4), and can simultaneously cut a rotating magnetic field of the inner rotor structure (3) and a rotating magnetic field of the outer rotor structure (4) to generate power generation current;
   an inner rotor structure (3), which is connected with the main shaft (1), has an independent permanent magnetic circuit and can be driven to rotate by the main shaft (1) to generate one rotating magnetic field; and
   an outer rotor structure (4), which is spaced apart from the inner rotor structure (3) by the coreless stator winding (2), is connected with the main shaft (1), has an independent permanent magnetic circuit and can be driven to rotate by the main shaft (1) to generate the other rotating magnetic field;
   wherein the outer rotor structure (4) comprises permanent magnets (41) of outer rotor, an annular load bearing piece (42) of outer rotor, a connecting piece (43) of outer rotor and a fixing casing (44) of outer rotor; the permanent magnets (41) of outer rotor are arranged on the inner wall of the annular load bearing piece (42) of outer rotor to form a permanent magnetic field; one end of the connecting piece (42) of outer rotor is connected with the inner wall of the annular load bearing piece (42) of outer rotor; the other end of the connecting piece (42) of outer rotor is connected with the fixing casing (44) of the outer rotor; and the fixing casing (44) of outer rotor is sleeved on the main shaft (1).

* * * * *